(12) United States Patent
Gouache et al.

(10) Patent No.: US 10,044,633 B2
(45) Date of Patent: Aug. 7, 2018

(54) METHOD FOR DISTRIBUTING AVAILABLE BANDWIDTH OF A NETWORK AMONGST ONGOING TRAFFIC SESSIONS RUN BY DEVICES OF THE NETWORK, CORRESPONDING DEVICE

(71) Applicant: THOMSON LICENSING, Issy les Moulineaux (FR)

(72) Inventors: Stephane Gouache, Cesson Sevigne (FR); Jean-Claude Colmagro, Mouaze (FR); Franck Abelard, Saint Armel (FR)

(73) Assignee: THOMSON LICENSING, Issy-les-Moulineaux ( * ) Notice: Subject to any disclaimer, the term of this patent is extended or adjusted under 35 U.S.C. 154(b) by 118 days.

(21) Appl. No.: 15/039,258

(22) PCT Filed: Oct. 31, 2014

(86) PCT No.: PCT/EP2014/073425
§ 371 (c)(1),
(2) Date: May 25, 2016

(87) PCT Pub. No.: WO2015/078658
PCT Pub. Date: Jun. 4, 2015

(65) Prior Publication Data
US 2017/0171103 A1    Jun. 15, 2017

(30) Foreign Application Priority Data

Nov. 27, 2013 (EP) ..................................... 13306625

(51) Int. Cl.
*G06F 15/16* (2006.01)
*H04L 12/917* (2013.01)
(Continued)

(52) U.S. Cl.
CPC .............. *H04L 47/76* (2013.01); *H04L 65/80* (2013.01); *H04L 65/608* (2013.01)

(58) Field of Classification Search
CPC ... H04L 1/0002; H04L 1/0007; H04L 1/0017; H04L 2001/0098; H04L 47/76; H04L 65/608; H04L 65/80
See application file for complete search history.

(56) References Cited

U.S. PATENT DOCUMENTS 6,449,647 B1 * 9/2002 Colby ..................... H04L 29/06
709/220
7,032,020 B2 * 4/2006 Gross .................. H04L 41/0896
370/252

(Continued)

FOREIGN PATENT DOCUMENTS

EP    2587824    5/2013
WO    WO2011125041    10/2011
(Continued)

OTHER PUBLICATIONS

Yoo et al., "Real-time Adaptive Streaming Mechanism with Device Capability for Resource Efficiency", 2012 International Conference on Computing, Networking and Communications (ICNC), Maui, Hawaii, USA, Jan. 30, 2012, pp. 204-210.

(Continued)

*Primary Examiner* — Zarni Maung
(74) *Attorney, Agent, or Firm* — Meagher Emanuel Laks Goldberg & Liao, LLP (57) ABSTRACT

A device of a network configured for implementing a method for distributing available bandwidth of the network amongst ongoing traffic sessions of devices of the network is described. The device includes a communication module, a ranking module, a calculator and a comparator. The communication module collects status messages from devices of the network running at least one traffic session.

(Continued)

The ranking module is configured to rank the ongoing traffic sessions according to parameters of devices and traffic sessions retrieved from status messages. The calculator is configured to determine bandwidth to be allocated to each ranked traffic session in function of the available bandwidth, a rank of the ranked traffic sessions and a type of the ranked traffic sessions. The comparator checks whether the determined bandwidth to be allocated to a traffic session of the device is different from zero such that available bandwidth can be distributed amongst ongoing traffic sessions.

15 Claims, 3 Drawing Sheets

(51) Int. Cl.
  *H04L 29/06* (2006.01)
  *G06F 12/00* (2006.01)

(56) References Cited

U.S. PATENT DOCUMENTS

| | | | |
|---|---|---|---|
| 7,743,161 | B2 | 6/2010 | Dey et al. |
| 8,531,954 | B2 * | 9/2013 | McNaughton ........ H04L 5/0064 370/235 |
| 8,688,855 | B2 * | 4/2014 | Van Leekwijck ... H04L 41/0896 709/235 |
| 2004/0103193 | A1 * | 5/2004 | Pandya ............... H04L 41/0896 709/224 |
| 2007/0294410 | A1 * | 12/2007 | Pandya .................. H04L 29/06 709/226 |
| 2008/0062877 | A1 * | 3/2008 | Chen ...................... H04L 47/10 370/235 |
| 2010/0262705 | A1 * | 10/2010 | Li ......................... H04W 28/00 709/229 |
| 2011/0032821 | A1 * | 2/2011 | Morrill ............... H04L 12/6418 370/230 |
| 2012/0213114 | A1 * | 8/2012 | Chen ..................... H04L 1/0002 370/252 |
| 2012/0252458 | A1 * | 10/2012 | Ohnishi ............... H04L 43/062 455/436 |
| 2012/0317299 | A1 | 12/2012 | Sathianathan et al. |
| 2013/0091248 | A1 | 4/2013 | Viswanathan et al. |
| 2013/0142037 | A1 * | 6/2013 | Chen ...................... H04L 47/10 370/229 |

FOREIGN PATENT DOCUMENTS

| | | |
|---|---|---|
| WO | WO2012134530 | 10/2012 |
| WO | WO2013019267 | 2/2013 |

OTHER PUBLICATIONS

Lee et al., "Adaptive Rate Control Scheme to Improve QoS of Multimedia Streaming Application", 2012 IEEE International Conference on Information Networking (ICOIN 2012), Bali, Indonesia, Feb. 1, 2012, pp. 76-80.
Anonymous, "HTTP Dynamic Streaming on the Adobe Flash Platform", Adobe Flash Platform Technical White Paper, Adobe Systems Inc., San Jose, 2010, pp. 1-18.
Akhshabi et al., "What Happens When HTTP Adaptive Streaming Players Compete for Bandwidth ?, ACM Workshop on Network and Operating Systems Support for Digital Audio and Video" Toronto, Ontario, Canada, Jun. 7, 2012, pp. 1-6.
Esteban et al., "Interactions Between HTTP Adaptive Streaming and TCP, ACM Workshop on Network and Operating Systems Support for Digital Audio and Video" Toronto, Ontario, Canada, Jun. 7, 2012, pp. 1-15.
Houdaille et al., "Shaping HHTP adaptive streams for a better user experience", ACM Multimedia Systems Conference, Chapel Hill, North Carolina, USA, Feb. 22, 2012, pp. 1-10.
Huang et al., "Confused, Timid and Unstable: Picking a Video Streaming Rate is Hard", ACM Internet Measurement Conference, Boston, Massachusetts, USA, Nov. 14, 2012, pp. 1-14.
Jiang et al., "Improving Fairness, Efficiency, and Stability in HTTP-based Adaptive Video Streaming with Festive", ACM International Conference on Emerging Networking Experiments and Technologies, Nice, France, Dec. 10, 2012, pp. 97-108.
Pantos et al., "HTTP Live Streaming draft-pantos-http-live-streaming-10", Informational Internet-Draft Version 10, Apple Inc., Cupertino, California, USA, Oct. 15, 2012, pp. 1-37.
Technical Specification ETSI TS 126 234 V10.1.0, "Universal Mobile Telecommunications System (UMTS); Transparent end-to-end Packet-switched Streaming Service (PSS); Protocols and codecs (3GPP specification)", ETSI, France, Apr. 2011, pp. 1-172.
Zambelli, A., "IIS Smooth Streaming Technical Overview", Microsoft Corp., Mar. 2009, pp. 1-17.
International Standard ISO/IEC 23009-12012, "Information technology—Dynamic adaptive streaming over HTTP (DASH)—Part 1: Media presentation description and segment formats", STD Version 2.1c2, Jan. 5, 2012, pp. 1-133.

* cited by examiner

METHOD FOR DISTRIBUTING AVAILABLE BANDWIDTH OF A NETWORK AMONGST ONGOING TRAFFIC SESSIONS RUN BY DEVICES OF THE NETWORK, CORRESPONDING DEVICE

This application claims the benefit, under 35 U.S.C. § 365 of International Application PCT/EP14/073425, filed Oct. 31, 2014, which was published in accordance with PCT Article 21(2) on Jun. 4, 2015 in English and which claims the benefit of European patent application 13306625.8, filed Nov. 27, 2013.

FIELD OF THE INVENTION

The present invention generally relates to bandwidth distribution in a network comprising, for instance but not exclusively, adaptive streaming clients.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

HTTP adaptive technologies are pushed by various stakeholders to allow provision of over the top audiovisual delivery in the Internet. Such technologies allow a client device to receive video in the form of small successive segments (a few seconds long), so called chunk. Each segment is requested through the HTTP protocol and may exist in different variants (so called representations), allowing the client device to choose at any time an appropriate bit rate matching the network and device constraints.

Among the HTTP adaptive streaming (HAS) protocols which are already used, the most famous are the HTTP Live Streaming (HLS) from Apple, the Silverlight Smooth Streaming (SSS) from Microsoft, the HTTP Dynamic Streaming (HDS) from Adobe and the Dynamic Adaptive Streaming over HTTP (DASH) initiated by 3GPP within the SA4 group and developed by MPEG. These HTTP adaptive streaming existing techniques vary in the manifest file format, said manifest providing meta-data to describe the content options (bit rate, image dimensions, frame rate . . . ), the organization of the available representations of the content in segments, in the codecs supported, and in the content protection technologies.

In particular, when a client device wants to play an audio/video content, it first has to get such a manifest describing how this specific content can be obtained. This is done through HTTP by getting some 'file' from an URL. This manifest file lists the available representations of the content (in terms of bit rate and other properties) and, for each representation, the URLs that allow loading the content chunks for each time slice. For Video on Demand (VoD), the entire description of the A/V content is provided, while for live content (e.g. TV content), the description covers only a short period of time and needs to be reloaded periodically to discover the new items when time passes.

Depending on its capabilities and the knowledge it has from the networking environment, the client device selects one representation (e.g. based on its bit rate) and loads the first chunk(s) of content. It buffers a few chunks to be able to cope with network impediments. Then, the A/V content is played from each received chunks one after the other. At the same time, the client device measures the reception rate and may decide to select a higher or a lower bit rate. In such case, it just requests the next chunk(s) from another representation. Every HTTP streaming technique is such that it is possible for the client device to ensure a continuous playout while switching from a chunk with a given bit rate to the next chunk with another bit rate. This way when the competing traffic on the network introduces variations on the rate at which the A/V content is received, the client device is able to react and adapt by selecting chunks with a bit rate that allows maintaining the buffer filling to a secure level. Indeed, the client device tries to reach the highest possible bit rate to provide a good viewing quality to end user, while staying at a level where the rendering will not suffer from late reception of data.

While these HAS techniques have proven to work reasonably well when compared to pre-existing technologies, recent works point out that under some specific challenging circumstances (i.e. competition with another HAS client or with another TCP flow on a bottleneck), HAS implementations can suffer from severe instability issues.

In particular, it has been observed that having two HAS clients competing for bandwidth leads to unpredictable results, ultimately jeopardizing the user experience. In addition, HAS devices show incapacity to reclaim their fair share of bandwidth when competing with a greedy TCP flow (e.g. bulk traffic) because of their periodic download profile resulting in OFF periods where the bandwidth is not evaluated and then potentially underestimated. And during these OFF periods in particular, the other TCP flow can take the opportunity to grab the bandwidth.

The present invention attempts to remedy at least—but not exclusively—to the instability and bandwidth sharing issues which are characteristic of all adaptive streaming implementations in presence of other streams.

SUMMARY OF THE INVENTION

The invention concerns a method for distributing available bandwidth of a network amongst ongoing traffic sessions run by devices of the network, which is remarkable in that it comprises, at a given device:
 collecting status messages from devices of the network running at least one traffic session;
 determining bandwidth to be allocated to each traffic session—ranked according to parameters of devices and traffic sessions retrieved from status messages—in function of the available bandwidth of the network, a rank of the ranked traffic session and a type of the ranked traffic session;
 when the determined bandwidth to be allocated to a traffic session of the given device is superior to zero, using said allocated bandwidth by the given device for said traffic session.

Thanks to the present invention, devices of a network can cooperatively determine the optimal bandwidth for each of them, thus effectively achieving the best possible collective user experience. Devices exchange and announce their respective characteristics and requirements, thanks to status messages. Based on this information, the optimal bandwidth repartition can be computed such that each device can receive the bandwidth it truly deserves avoiding wasted bandwidth due to approximations.

As an example compliant with the present invention, a status message can comprise at least some of the following elements:
- session start time;
- session end time;
- type of the device running the session;
- size of the display;
- display resolution of the device;
- number of users;
- type of the session;
- required bit rate for a fixed streaming session;
- list of available bit rates for an adaptive streaming session;
- maximum desired bit rate for an adaptive streaming session;
- maximum desired bit rate for a bulk traffic session;
- chunk duration for an adaptive streaming session;
- priority of the device.

Preferably, one status message is associated with one ongoing traffic session.

In addition, according to present invention, a status message is sent by the given device to all the devices of the network, when an event occurs.

In particular, said event can belong to a group comprising at least the following events:
- start of a traffic session by the given device;
- stop of a traffic session by the given device;
- modification of any characteristic of an ongoing traffic session run by the given device.

According to a further aspect of the invention, during the ranking, a rank for each of the traffic sessions can, advantageously, be determined based on a priority of the device running said traffic session, a type of the device and a type of the traffic session.

In addition, within a given rank, the corresponding traffic sessions can preferably be ordered in function of their start time.

Moreover, the available bandwidth of the network can be provided by a gateway of the network.

Besides, in a preferred embodiment of the present invention, the determination of bandwidth to be allocated to the ranked traffic sessions comprises:
- selecting a highest ranked traffic session not processed yet;
- checking whether the selected traffic session is a fixed rate streaming session;
- allocating bandwidth to the selected traffic session when the difference between the current available bandwidth of the network and the required bit rate associated with the fixed rate streaming session is at least equal to zero.

In another aspect of said preferred embodiment, the determination of bandwidth to be allocated to the ranked traffic sessions can further comprise, in case the selected traffic session is an adaptive streaming session:
- selecting a bitrate at most equal to the current available bandwidth divided by the number of traffic sessions not processed yet and having the same rank as the selected traffic session;
- determining a minimum bitrate between the selected bit rated and a maximum desired bitrate associated with the selected traffic session;
- allocating said minimum bitrate to the selected traffic session.

In a further aspect of said preferred embodiment, the determination of bandwidth to be allocated to the ranked traffic sessions can further comprise decrementing current available bandwidth by the allocated bandwidth.

Besides, the present invention also concerns a device of a network configured for implementing the method for distributing available bandwidth of said network amongst ongoing traffic sessions of devices of the network as previously described.

According to the invention, said device comprises:
- a communication module adapted to collect status messages from devices of the network running at least one traffic session;
- a ranking module configured to rank said ongoing traffic sessions according to parameters of devices and traffic sessions retrieved from status messages;
- a calculator configured to determine bandwidth to be allocated to each ranked traffic session in function of the available bandwidth, a rank of the ranked traffic session and a type of the ranked traffic session;
- a comparator able to check whether the determined bandwidth to be allocated to a traffic session of the device is different from zero.

The communication module can be further configured to send a status message to all the devices of the network.

Moreover, the ranking module can advantageously determine a rank for each of the traffic sessions based on the priority of the device running said traffic session, the type of the device and the type of the traffic session.

The present invention further concerns a computer program product downloadable from a communication network and/or recorded on a medium readable by computer and/or executable by a processor, comprising program code instructions for implementing the above mentioned method.

In addition, the present invention also concerns a non-transitory computer-readable medium comprising a computer program product recorded thereon and capable of being run by a processor, including program code instructions for implementing the method previously described.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which.

Figure 2:
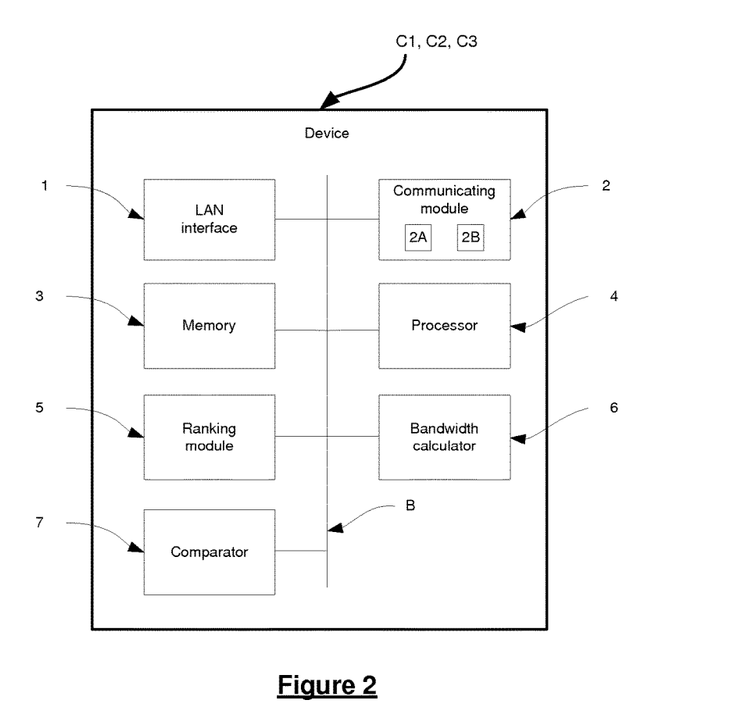
FIG. 2 is a block diagram of an example of a client device of the network architecture of FIG. 1 implementing the method for distributing available bandwidth according to the present invention.

In FIG. 2, the represented blocks are purely functional entities, which do not necessarily correspond to physically separate entities. Namely, they could be developed in the form of software, hardware, or be implemented in one or several integrated circuits, comprising one or more processors.

Wherever possible, the same reference numerals will be used throughout the figures to refer to the same or like parts.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein.

Figure 1:
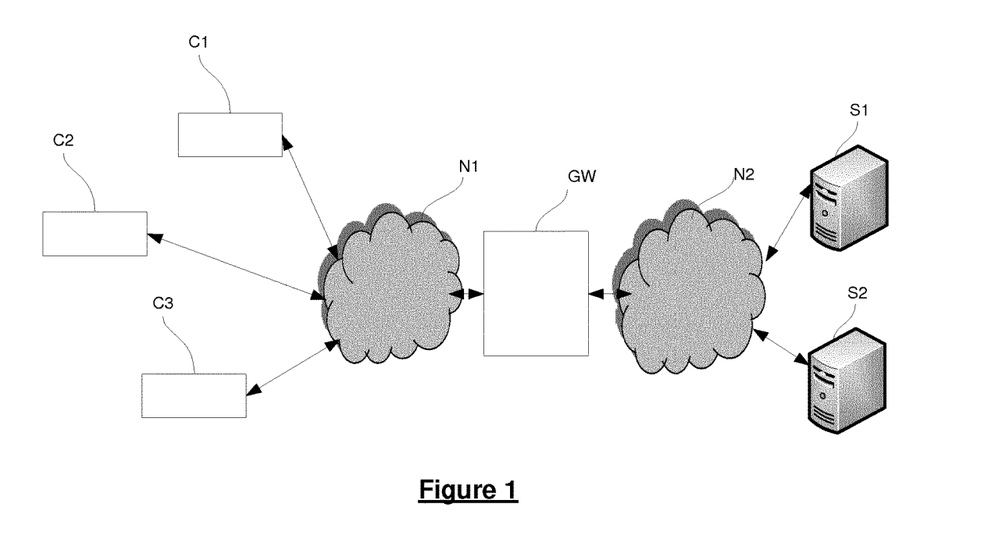
FIG. 1 is a schematic diagram of a Client-Server network architecture wherein the present invention might be implemented.

As depicted in FIG. 1, the Client-Server network architecture—wherein the present invention might be implemented—comprises for example three client devices C1, C2 and C3, a residential gateway GW and several servers S1 and S2 (only two are represented on FIG. 1). Obviously, additional clients may be present in said architecture.

The devices C1, C2 and C3 are connected to a local network N1 (as a home network or an enterprise network). The local network N1 is connected to the broadband network N2 (such as the Internet) thanks to the gateway GW.

Each device C1 to C3 is adapted to establish one or more traffic sessions (such as a fixed rate streaming session, an adaptive streaming session (e.g. HAS), a bulk traffic session) by connecting with one or more of remote servers S1, S2 through the broadband network N2.

To this end, as represented in FIG. 2, each device C1 to C3 is equipped with:
- a LAN (Local Area Network) interface of connection 1 (wired and/or wireless, as for example Wi-Fi, Ethernet, etc.) to the local network N1;
- a communication module 2 comprising:
  - a management interface 2A in relation with a management communication bus implementing the publish/subscribe paradigm (e.g. Data Distribution Service (DDS), Java Message Service (JMS), Qeo, not represented on the Figures), whereby the device can send and collect a status message to all other devices C1 to C3 of the local network N1 and the gateway GW. The status message is preferably a persistent message, so that it can be collected by any device of the network (even if the device is not connected to the network N1 at the time of the sending). In particular, a status message can, for instance, be either collected by a background service running on the management interface 2A of the device or can be stored by the management communication bus as a long lived status message to be retrieved by the management interface 2A (e.g. periodically or when necessary);
  - an application interface 2B whereby control and data messages associated with a given session are sent and received by the device.
- The communication module 2 contains the protocol stacks to communicate with servers S1, S2. In particular, the communication module 2 comprises the TCP/IP stack well known in the art. Of course, it could be any other type of network and/or communicating means enabling the devices C1 to C3 to communicate with the servers S1, S2;
- a memory 3 represented in the form of a single block, but can comprise at one and the same time random-access memory, read-only memory and reprogrammable persistent memory (of example 'Flash' type);
- one or more processor(s) 4 for executing the applications and programs stored in the memory 3 of the device;
- an internal bus B to connect the various modules and all means well known to the skilled in the art for performing the generic client device functionalities.

In addition, depending of their type, devices C1 to C3 may also comprise an adaptive streaming module (which continually selects the chunk at the bit rate that better matches the network constraints and its own constraints), a video player adapted to decode and render the multimedia content, a buffer configured for buffering the chunks received from the server before their transmission to the video player, etc. (said modules being not represented in the FIG. 2).

In the preferred embodiment, the devices C1 to C3 can be a portable media device, a mobile phone, a tablet, a laptop, an HDTV, etc. Naturally, the devices C1 to C3 might not comprise a complete video player, but only some sub-elements such as the ones for demultiplexing and decoding the media content and might rely upon an external means to display the decoded content to the end user.

According to the preferred embodiment, each status message of a traffic session, sent or collected by a device C1 to C3 of the network N1, can comprise at least some of the following elements:
- session start time,
- session end time;
- type of the device running the session;
- size of the display;
- display resolution of the device;
- number of users;
- type of the session;
- required bit rate for a fixed streaming session;
- list of available bit rates for an adaptive streaming session;
- maximum desired bit rate for an adaptive streaming session;
- maximum desired bit rate for a bulk traffic session;
- chunk duration for an adaptive streaming session;
- priority of the device.

In particular, a status message can comprise several fields (for instance seven fields), each field gathering one or more of the above mentioned elements as below illustrated:

```
1) session start time, end time
2) device_type
3) display_size
4) display_resolution
5) num_users, users_present
6) type_of_traffic (fixed rate streaming, adaptive
   streaming, bulk traffic)
   a) for fixed rate: required bitrate in [kbps]
   b) for adaptive streaming: list of available
      bitrates in [kbps], chunk
      duration, maximum desired rate in [kbps]
   c) for bulk traffic: maximum desired rate
      in [kbps] (optional)
7) device_priority
```

Device Status Message

The field 1 contains the start time of a traffic session, with the end time initially set to 0 (zero). To indicate the termination of a session, the field end time is set to a non-zero value.

The fields 2, 3 and 4 are related to the type of the device sending the status message, the size of the display of the device and the resolution of the display, respectively.

The field 5 can be used in various manners, depending on the capabilities of the sending device, provided it conforms to a simple syntax. When available, it lists the users currently watching the device (e.g. John, Wendy, Lisa, etc.), otherwise only the number of users (0 . . . n) is used (0 indicates that nobody is in front of a particular device). In addition, an illegal value (e.g. −1) can be used to show that the sending device cannot determine the presence of watching users.

The field 6 specifies the type of traffic which can be used to infer its adaptation capability. In the preferred embodiment, the following types of traffic are considered: fixed rate streaming, adaptive streaming, bulk traffic. When a fixed rate streaming is considered, then the required bitrate is also present in the status message. For an adaptive streaming session, the available bit rates found in the manifest are indicated as well as the maximum desired bit rate. It has to be noted that a device may have various reasons to desire a bit rate lower than the maximum available bit rate (low end-to-end bandwidth, video hidden by another window, video not full screen (Picture in Graphics), etc.). Similarly, for bulk traffic (e.g. download of non-streaming data), a desired rate can be included, so as to allow capping of the bandwidth use.

The field 7 is used to indicate a priority of the device. It is generally left to 0 (zero) but can be used to show a temporary change, for instance to give a particular device an extra advantage over the others devices.

In addition, the gateway GW is also configured to generate a status message including, for instance, the following information:

available bandwidth of the broadband network N2 in [kbps] (so called access bandwidth;
available bandwidth of the local network N1 in [kbps];
list of services as device description, type of traffic, bitrate.

---

1) access_bandwidth in [kbps]
2) local_bandwidth in [kbps]
3) list_services as (device_description; type_of_traffic; bitrate)

---

Gateway Status Message

The field 3 can be used to inform users about the services currently running so that they can take appropriate actions (such as switching off a bandwidth hogging device or reprioritizing the streams manually). To that end, the device description field is built by including the device description and the users to make it easy to locate the culprit. Moreover, this list can be used to inform devices about streams seen by the gateway GW which have not been announced through status messages (e.g. streams generated by legacy devices and applications).

Said gateway status message—which is also a persistent message as the device status message—is sent by the gateway GW either periodically or each time one parameter changes (e.g. the local bandwidth, the access bandwidth). Thus, the devices of the local network N1 can have access—in a passive manner—to the local and access bandwidths.

Figure 3:
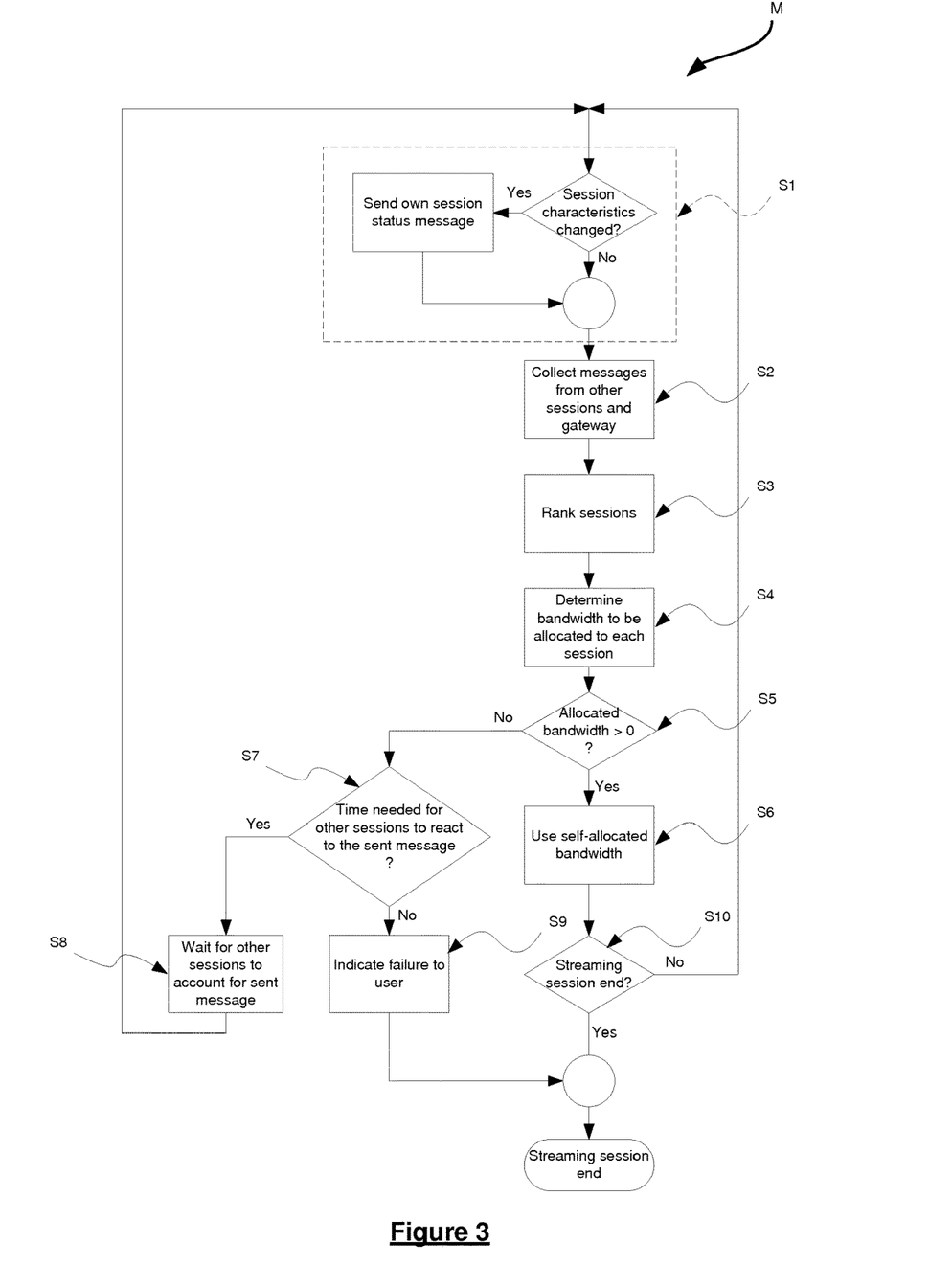
FIG. 3 is a flowchart depicting the main steps of the method for distributing available bandwidth, according to the preferred embodiment.

According to the preferred embodiment of the invention and as illustrated on FIG. 3, devices C1 to C3 are configured to implement a method for distributing available bandwidth of the network N1 amongst ongoing traffic sessions run by devices C1 to C3.

In particular, when implemented in a given device of the network N1 (e.g. the device C1), the method M comprises the following steps of:

sending (step S1), via the communication module 2, the status message to all the other devices C2, C3 of the network N1 and the gateway GW. Said status message is associated with a particular traffic session run by the device C1 (one status message per session) and is advantageously sent every time a new traffic session is launched by the device C1, an ongoing traffic session of the device C1 ends or when any of the characteristics of its ongoing traffic session(s) is modified. Taking the particular case of an adaptive streaming session as an example, if the device C1 keeps switching between available representations, a status message would be sent again each time a chunk is requested such that all the other devices are informed and can react to the change. In a variant of the preferred embodiment, status messages may also be sent periodically by devices, instead of being broadcasted upon a given event;

collecting (step S2), via the communication module 2, status messages from devices C2, C3 of the network N1 which run at least one ongoing traffic session and from the gateway GW. Said collected status messages can be stored in the memory 3 of the device C1. Steps S1 and S2 may be performed independently from each other (S1 before S2; S2 before S1 or S1 and S2 concurrently);

ranking (step S3), thanks to a ranking module 5 of the device C1, said ongoing sessions according to parameters of the corresponding devices and parameters of said sessions. The values of said parameters are retrieved from the collected status messages. During step S3, a ranking list is built by the ranking module 5 and stored, for instance, in the memory 3;

determining (step S4) bandwidth to be allocated to each ranked session, thanks to a bandwidth calculator 6 of the device C1, in function of the total available bandwidth of the local network N1 (obtained from the gateway status message), the rank of the sessions determined by the ranking module 5 and the type of the ranked sessions. In a variant or in a complement, other features may be used or added to determine the bandwidth to be allocated to each ongoing session;

checking (step S5), thanks to a comparator 7 of the device C1, whether the determined bandwidth to be allocated to a session of the given device C1 is superior to zero or not;

when the determined bandwidth to be allocated to a session of the given device C1 is superior to zero, using (step S6) of the self-allocated bandwidth by the given device C1 for said session;

when the determined bandwidth to be allocated to a session of the given device C1 is equal to zero (step S7), verifying if time is needed for other sessions to react to the status message sent by the given device C1 (e.g. a competing ongoing HAS session assumes the availability of a constant bandwidth for the upcoming chunk duration, so that it is preferable to wait until the end of the chunk download even in case the rank of the session of the given device C1 is higher than the one of said HAS session);

in case time is needed for other session to react to the status message sent by the given device C1 (step S8), waiting for other ongoing session(s) to take into account said sent status message (e.g. for an adaptive streaming session, after the end of the downloading of the current chunk and the emission of a new status message by the associated device running the adaptive streaming session) and then go back to step S1;
in case no time is needed for other session to react to the status message sent by the given device C1 (step S9), indicating a failure to user of the device C1.

In case the session of the device C1 is not finished yet (step S10), the method M goes back to step S1 and repeats next steps.

The method M can be performed:
upon receipt of a new status message from a device of the network N1 in case the session run by the given device C1 (implementing method M) is a fixed rate session or a bulk traffic session; or
periodically with a corresponding period:
arbitrarily determined (e.g. 10 seconds) in case the session run by the given device C1 is a fixed rate session or a bulk traffic session; or
equals to the duration of chunk in case of an adaptive streaming session run by given device C1.

According to the preferred embodiment, the ranking step S3, implemented by the ranking module 5, comprises the following sub-steps of:
establishing (S31) a process list of all the ongoing sessions of the network N1 to process from the collected status messages;
determining (S32) the rank of each session of the process list (e.g. by starting with the first session of the process list or with a session of said list randomly chosen) based on based on the priority of the device running said traffic session, the type of the device and the type of the traffic session. In an illustrative but non limitative example, the rank of a session is determined from the following formula:

Rank=MAX−$PW$×priority−$DP$(DeviceType)−$FP$(SessionType)−$AP$(SessionType)

wherein:
MAX is a constant, for instance equal to 10 allowing for 10 different ranks (by notation, rank 0 being the highest rank);
Priority is the priority associated with the device running the session to be ranked;
PW is a constant weighting the priority, for instance equal to 5 allowing for 2 different priorities (a high priority 1 and a low priority 0), so that devices with the high priority (1) will be distributed amongst higher ranks 0 to 5 and devices with the low priority (0) will be distributed amongst lower ranks 6 to 10;
DP is a constant corresponding to the device type precedence, for instance equal to 3 when the device type is HDTV, otherwise equal to 0. In other words, the value (3 or 0) of DP depends on the type of the device;
FP is a constant corresponding to the fixed rate streaming session precedence, for instance equal to 2 when the traffic session is a fixed rate session, otherwise equal to 0. In other words, the value (2 or 0) of FP depends on the type of the traffic session;
AP is a constant corresponding to the adaptive streaming session precedence, for instance equal to 1 when the traffic session is an adaptive streaming session, otherwise equal to 0. In other words, the value of AP depends on the type of the traffic session.

Thanks to such a formula, sessions with a high priority are distributed in the first ranks, and sessions with a low priority are arranged in the last ranks. At equal priority, the devices having the HDTV type will be favored in contrast to, for instance, tablets or smartphones. In addition, fixed rate sessions are preferably treated before adaptive streaming sessions, which are preferably treated before bulk traffic;
ordering (step S33) the sessions of each rank in ascending order of their start time, such that previously started sessions are handled in priority compared to newly started sessions assigned to the same rank. Obviously, sessions that have indicated their termination (by means of the end time field) are discarded from the process list.

As a result of the ranking step S3, a ranking list is derived. This ranking list—having a two level structure—is composed of a list of ranks. In each rank, the sessions are ordered in function of their start time. Thus, sessions in the first rank will be served first (in terms of bandwidth allocation), followed by the sessions of the next rank and so on. In particular, when sessions of the same rank are adaptive streaming sessions, it is possible to evenly distribute the remaining bandwidth to the sessions of this rank before considering the next rank.

Figure 4:
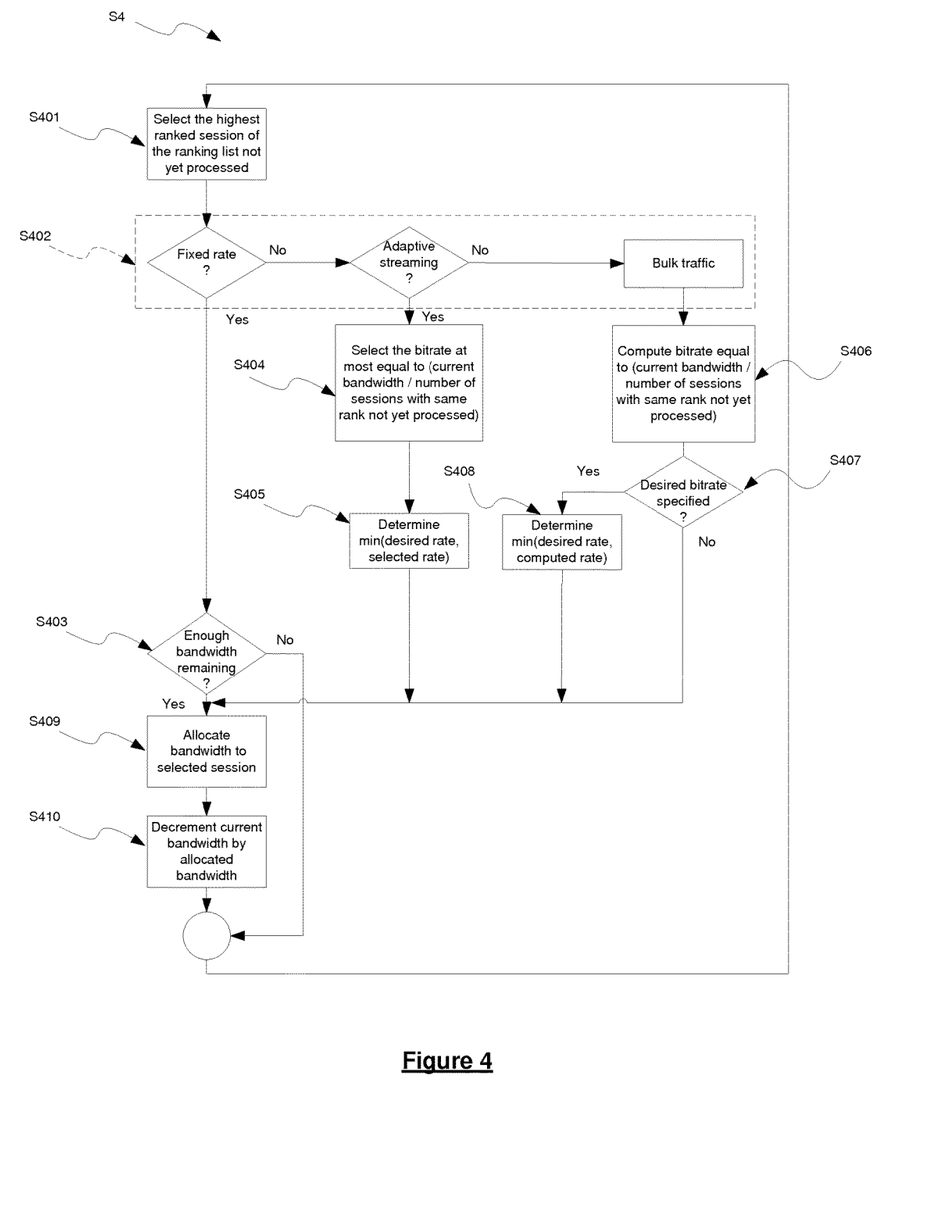
FIG. 4 is a flowchart specifying the bandwidth determination step of the method of FIG. 3.

According to the preferred embodiment and as shown on FIG. 4, the bandwidth determining step S4, implemented by the bandwidth calculator 6 of the device C1, comprises the following sub-steps of:
selecting (step S401) the highest ranked traffic session of the ranking list which has not been processed yet;
checking (step S402) whether the selected traffic session is a fixed rate streaming session, an adaptive streaming session or a bulk traffic session;
in case the selected session is a fixed rate streaming session, determining (step S403) whether the difference between the current available bandwidth of the network N1 (obtained from the gateway status message) and the required bit rate associated with the fixed rate streaming session (indicating in the corresponding status message) is at least equal to zero;
in case the selected session is an adaptive streaming session:
selecting (step S404) the bitrate (amongst the available bitrates retrieved from the corresponding manifest) at most equal to the current available bandwidth divided by the number of traffic sessions not processed yet and having the same rank as the selected session (in step S401). In case, no bitrate amongst the available bitrate of the manifest is lower than the current available bandwidth divided by the number of traffic sessions not processed yet with same rank, the selected bit rate is equal to zero;
determining (step S405) the minimum bitrate between the selected bit rate (step S404) and the maximum desired bitrate associated with the selected session (retrieved from the associated status message);
in case the selected session is a bulk traffic session:
computing (step S406) the bitrate equal to the current available bandwidth divided by the number of traffic sessions not processed yet and having the same rank as the selected session (in step S401);
checking (step S407), from the associated status message, whether a maximum desired bitrate is associated with the selected bulk traffic session or not;
in case a maximum desired bitrate is associated with the selected bulk traffic session, determining (step S408) the minimum bitrate between the computed bit rate (step S406) and the maximum desired bitrate associated with the selected session;

allocating (step 409) bandwidth to the selected session.
The allocated bandwidth is equal to:
the required bit rate when the selected session is a fixed rate streaming session;
the determined minimum bit rate (of step 405) when the selected session is an adaptive streaming session;
the computed bit rate (of step 406) or the determined minimum bit rate (of step 408) when the selected session is a bulk traffic session;
decrement (step 410) current bandwidth by the bandwidth allocated in step 409.

The steps S401 to S410 are preferably repeated until all sessions of the ranking list have been processed.

Then, in the preferred embodiment, the actual bandwidth allocation takes into account the chunk duration for the ongoing adaptive streaming sessions. Indeed, since ongoing sessions assume the availability of a constant bandwidth for the upcoming chunk duration, it is undesirable to modify these conditions before the end of the chunk. Therefore, upon session start, a higher rank session will be deferred until the ongoing sessions have received the newly started session information and accounted for its presence by reducing their own allocated bandwidth. This delay is specific to each ongoing session, leading to a stepwise return of the bandwidth to the high rank session (as described hereinafter). In the case of a fixed rate and bulk sessions, the processing of the status messages sent by other devices of the network N1 is done periodically in a similar manner, with the difference that the period is fixed arbitrarily (for instance 10 seconds), to determine when the device running a fixed rate or bulk session will have considered a new status message sent by a device to start a new session.

Once the bandwidth is allocated to a session of a device, the latter has the right to use it fully but may still adjust its actual use based on bandwidth measurements, as known HAS implementations do.

If the bandwidth was not allocated due to the presence of competing sessions which need time to re-adjust their bandwidth use, the device C1 can determine the amount of time it needs to wait based on the received information. If the bandwidth allocation failure is not due to the presence of lower priority devices (most likely because there are higher priority sessions ongoing), then the newly starting session is cancelled, indicating the failure to the user.

The method M is iterative, so that a starting session having been deferred on the first iteration can have its share of bandwidth freed by ongoing sessions at the second iteration. Similarly, ongoing sessions can continuously adjust their bandwidth usage upon receipt of messages describing new sessions. Whenever a session is allocated a bandwidth equal to zero, it stops.

Thanks to the preferred embodiment of the present invention, a much finer control over bandwidth use can be achieved because each device of the network announces precisely, for instance, which bit rates it can receive, when it starts and stops playing, removing the need for guesswork and approximation. Since devices exchange rich information about their capabilities and respective priorities, a bandwidth distribution can be achieved that actually reflects the user expectations. It can solve the bandwidth competition problem in a deterministic manner, preserve devices priorities and avoid wasted bandwidth.

In the three next examples, it is assumed (for clarity reasons) that the status messages are sent periodically, the period being an arbitrary period for fixed rate and bulk traffic sessions and equal to the duration of a chunk for adaptive streaming sessions.

In a first illustrative example of the preferred embodiment, it is assumed that the access network has a bandwidth of 8 Mbps, as reported by the ADSL gateway GW. The user—wishing to watch a Video on Demand (VoD) on his HDTV—starts a HAS application implementing the method M. Noticing that no other stream is currently using the network, the HAS application instantly converges on the highest bitrate allowable for the current network bandwidth.

In a second illustrative example, it is also assumed that the access network has a bandwidth of 8 Mbps. A part of the network bandwidth is already used by a tablet and a smartphone consuming a HAS stream. For the sake of simplicity, it is assumed that the HAS streams have identical bit rates (namely 200, 400, 600, 1200, 1800, 2500, 4500, 6500 and 8500 Kbps) listed in their corresponding manifests. It is noted:

t1: the time when the first HAS client—running on the tablet—last reported the characteristics of the HAS stream it is consuming, having chunk of duration d1;

t2: the time when the second HAS client 2—running on the smartphone—last reported the characteristics of its stream, having chunks of duration d2.

Thanks to the availability of the network bandwidth, first and second HAS clients are enjoying a relatively high quality stream at 4.5 Mbps and 2.5 Mbps respectively.

At a time t3, a third HAS client—running on a HDTV—is started. It retrieves the parameters of the desired HAS stream, picks the highest bitrate lower than the access network capacity as its desired bitrate and sends the status message describing the session on the network. The HDTV has priority over the tablet and the smartphone. Nevertheless, the third HAS client should preferably leave some time to the first and second HAS clients to account for the received message. Since first HAS client sent its last status message at t1 and since third HAS client sent its status message at t3 (assuming t3<t1+d1), both first and third clients are aware of the presence of each other and able to adjust their bandwidth usage accordingly at t1+d1. For first HAS client, this happens at the next loop iteration, when the allocated bandwidth is computed. Similarly, assuming t3<t2+d2, second HAS client 2 will be adjusting its bandwidth usage at t2+d2. For third HAS client, the time max (t1+d1, t2+d2) is used to determine when the method M can be run, because bandwidth will be freed by first and second HAS clients. This computation is performed identically on all devices, resulting in the maximum bandwidth for the high rank device (running the third HAS client), selected as the highest available bitrate lower that the access link capacity and the rest is distributed among first and second HAS clients. Given the set of available bitrates for the different sessions, 6.5 Mbps is allocated to the third HAS client whereas first and second HAS clients are allocated 600 kbps.

In a third example, it is considered a wireless network organized around a smartphone serving as a wireless hotspot for two tablets. The network bandwidth is assumed to be of 8 Mbps as announced by the smartphone which indicates the current access bandwidth using gateway status messages. The first client—running on one of the tablets—starts playing a fixed rate stream at 5 Mbps, announces the stream characteristics and listens for messages. Later, a second client—running on the other tablet—starts playing a HAS stream. The first client, consuming a fixed rate stream, is ranked first compared to the second client. Therefore, the first client continues to play its stream while the second client uses the remaining bandwidth to select the appropriate rate from the HAS stream. Assuming the same available bitrates as in the above examples, the second client will pick the 2500 kbps stream. After a while, due to an external event, the speed of the wireless network used by the smartphone drops to 4 Mbps. The smartphone informs the devices in the network by sending a new, updated gateway status message, indicating the current network capacity. In response to this gateway status message, the first client determines that the available bandwidth is too low to proceed with the playout of the fixed rate stream it is consuming and sends a status message to indicate the termination of the session, setting the end time field with a non-zero value. Assuming t2 is the time when the second HAS client last ran the method M before the sending of the session termination message by the first client with d2 the chunk duration, then, at t2+d2, the second client switches to the 2500 kbps stream since the 4 Mbps of the access bandwidth has become available.

The flowchart and/or block diagrams in the Figures illustrate the configuration, operation and functionality of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a random access memory (RAM); a read-only memory (ROM); an erasable programmable read-only memory (EPROM or Flash memory); a portable compact disc read-only memory (CD-ROM); an optical storage device; a magnetic storage device; or any suitable combination of the foregoing.

The invention claimed is:

1. Method, performed by a given device amongst devices of a network for distributing available bandwidth of the network amongst ongoing traffic sessions run by the devices of the network, comprising:
   collecting status messages from the devices of the network running at least one traffic session, the devices of the network exchanging and announcing their respective characteristics and requirements to other devices of the network using the status messages;
   determining a bandwidth to be allocated to each traffic session, ranked according to parameters of devices and traffic sessions retrieved from the status messages, as a function of the available bandwidth of the network, a rank of the ranked traffic sessions and a type of the ranked traffic sessions;
   when the determined bandwidth to be allocated to a traffic session of the given device is superior to zero, using said allocated bandwidth by the given device for said at least one traffic session.

2. Method according to claim 1, wherein one status message is associated with one ongoing traffic session.

3. Method according to claim 1, wherein a status message is sent by the given device to all the devices of the network when an event occurs.

4. Method according to claim 3, wherein said event belongs to a group comprising at least the following events:
   start of a traffic session by the given device;
   stop of a traffic session by the given device;
   modification of any characteristic of an ongoing traffic session run by the given device.

5. Method according to claim 1, wherein, during the ranking, a rank for each of the traffic sessions is determined based on a priority of the device running said traffic session, a type of the device and a type of the traffic session.

6. Method according to claim 1, wherein, within a given rank, corresponding traffic sessions are ordered as a function of their start time.

7. Method according to claim 1, wherein the available bandwidth of the network is provided by a gateway of the network.

8. Method according to claim 1, wherein the determining a bandwidth to be allocated to each traffic session comprises:
   selecting a highest ranked traffic session not processed yet;
   checking whether the selected traffic session is a fixed rate streaming session;
   allocating bandwidth to the selected traffic session when the difference between the current available bandwidth of the network and the required bit rate associated with the fixed rate streaming session is at least equal to zero.

9. Method according to claim 8, wherein the determining a bandwidth to be allocated to each traffic session, in case the selected traffic session is an adaptive streaming session:
   selecting a bitrate at most equal to the current available bandwidth divided by the number of traffic sessions not processed yet and having the same rank as the selected traffic session;

determining a minimum bitrate between the selected bitrate and a maximum desired bitrate associated with the selected traffic session;

allocating said minimum bitrate to the selected traffic session.

10. Method according to claim 8, wherein the determining a bandwidth to be allocated to each traffic session further comprises decrementing current available bandwidth by the allocated bandwidth.

11. Computer program product downloadable from a communication network and stored on a non-transitory computer storage medium readable and executable by a processor, comprising computer program code instructions for implementing the method according to claim 1.

12. Non-transitory computer-readable medium comprising a computer program product recorded thereon and capable of being run by a processor, including program code instructions for implementing the method according to claim 1.

13. Device of a network configured to run at least one traffic session and to implement a method for distributing available bandwidth of said network amongst ongoing traffic sessions of devices of the network, comprises:

a communication module configured adapted to collect status messages from the devices of the network running at least one traffic session, the devices of the network exchanging and announcing their respective characteristics and requirements to other devices of the network using the status messages;

a ranking module configured to rank said ongoing traffic sessions according to parameters of devices and traffic sessions retrieved from the status messages;

a calculator configured to determine a bandwidth to be allocated to each ranked traffic session as a function of the available bandwidth, a rank of the ranked traffic sessions and a type of the ranked traffic sessions;

a comparator able to check whether the determined bandwidth to be allocated to a traffic session of the device is different from zero.

14. Device according to claim 13, wherein the communication module is further configured to send a status message to all the devices of the network.

15. Device according to claim 13, wherein the ranking module determines a rank for each of the traffic sessions based on the priority of the device running said traffic session, the type of the device and the type of the traffic session.

* * * * *